US007864035B2

(12) United States Patent
Ray

(10) Patent No.: US 7,864,035 B2
(45) Date of Patent: Jan. 4, 2011

(54) SYSTEM AND METHOD FOR DETERMINING WHETHER A CORDLESS HANDSET IS AT A BASE UNIT

(75) Inventor: Amar Nath Ray, Shawnee, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 492 days.

(21) Appl. No.: 11/977,842

(22) Filed: Oct. 26, 2007

(65) Prior Publication Data
US 2009/0109028 A1    Apr. 30, 2009

(51) Int. Cl.
*G08B 23/00* (2006.01)
*G08B 25/00* (2006.01)
*G08B 21/00* (2006.01)
*H04M 1/00* (2006.01)
*H04M 9/00* (2006.01)

(52) U.S. Cl. ............... 340/502; 340/524; 340/687; 379/424; 379/455

(58) Field of Classification Search . 340/539.1–539.11, 340/568.1–568.4, 687, 502; 379/446, 454, 379/455, 457, 396, 164, 424–427
See application file for complete search history.

(56) References Cited

U.S. PATENT DOCUMENTS

| | | | | |
|---|---|---|---|---|
| 3,906,168 A | * | 9/1975 | McEowen | 379/162 |
| 5,479,486 A | * | 12/1995 | Saji | 455/573 |
| 5,610,593 A | * | 3/1997 | Seto | 340/653 |
| 5,684,868 A | * | 11/1997 | Alexander | 379/140 |
| 5,852,785 A | * | 12/1998 | Bartholomew et al. | 455/561 |
| 6,041,119 A | * | 3/2000 | Kato et al. | 379/424 |
| 6,603,855 B1 | * | 8/2003 | Cannon et al. | 379/377 |
| 7,013,153 B2 | * | 3/2006 | Beamish et al. | 455/462 |
| 7,212,842 B1 | * | 5/2007 | Seymour | 455/573 |
| 2002/0176571 A1 | * | 11/2002 | Louh | 379/455 |
| 2007/0127673 A1 | * | 6/2007 | Hoffman | 379/207.04 |

OTHER PUBLICATIONS

"VoIP over Wifi—A Field Report"; Martin's Mobile Technology Page; Oct. 23, 2006; available online at URL: <http://mobilesociety.typepad.com/mobile_life/2006/10/voip_over_wifi_.html>. (3 pages).

* cited by examiner

*Primary Examiner*—Jennifer Mehmood
(74) *Attorney, Agent, or Firm*—Woodard Emhardt Moriarty McNett & Henry LLP

(57) ABSTRACT

A phone, method, and system are presented for determining whether a cordless handset is positioned on a base unit of a cordless telephone. An on-base unit signal may be generated in response to a cordless handset being positioned in contact with a base unit of a cordless telephone and an off-base unit signal may be generated in response to the cordless handset not being positioned in contact with the base unit. The on-base unit signal or the off-base unit signal, depending upon the position of the cordless handset, may be communicated over a communications network with which the base unit is in communication.

12 Claims, 4 Drawing Sheets

SYSTEM AND METHOD FOR DETERMINING WHETHER A CORDLESS HANDSET IS AT A BASE UNIT

BACKGROUND OF THE INVENTION

Telephones have existed for over a century and have proven to be an indispensable part of modern society. While telephones were initially crude devices with limited functionality, they have evolved into several varieties with increasing feature sets. One variety that has been around for years are cordless or portable phones. Rather than being limited by the length of a cord connecting a receiver to a base unit of the phone, a wireless radio transmitter communicates radio signals between the receiver and the base unit to provide freedom for the user to carry on a conversation anywhere within range of the base unit.

Cordless phones have been common for decades in the consumer market, mostly being used in residential settings. Other industries, such as hospitality and health care, have been more limited in their use of cordless phones. Cordless phones may allow a guest staying at a hotel to bring the phone to the pool, fitness center, or other area within range of the base unit in the guest's hotel room to take advantage of the facilities, while remaining in contact by phone. This enables the hotel to retain potential revenue generated by the telephone, while allowing the guests the freedom to wander within and leave their room. In addition to convenience, there are other reasons, such as safety and handicap accessibility, for wanting to provide a cordless phone to hotel guests.

A number of reasons exist, however, for the lack of acceptance of cordless phones in non-residential settings. Initial cost and potential damage to the handset are two issues. Another main issue is that cordless phones are more easily lost or stolen by the very nature of its being un-tethered from the base unit. This drives up the cost to the hotel, cruise line, hospital or other phone owner, in order to replace the missing equipment.

Similar to television remotes that only work with a specific "hotel model" of a television, cordless telephone handsets may be altered to work only with the "hotel model" of the base unit. However, guests do not always realize the handset will not work with the devices that they own at their own home, preventing this from being an effective deterrent to curb the rate at which the telephones, and the handsets in particular, are stolen or otherwise lost or misplaced.

SUMMARY OF THE INVENTION

In order to ensure a cordless telephone handset is positioned on a corresponding base unit with minimal cost and effort, the principles of the present invention provide for a cordless telephone to be configured to remotely provide status of the cordless telephone handset with respect to being at the corresponding base unit. By providing the status of the handset, an owner of the telephone can be notified of the status of the phone to ensure the handset is not lost prior to an action such as checking out of a hotel or releasing a patient from a hospital.

One embodiment of a method for determining whether a cordless handset is positioned on a base unit of a cordless telephone may be performed by generating an on-base unit signal in response to a cordless handset being positioned in contact with a base unit of a cordless telephone. An off-base unit signal may be generated in response to the cordless handset not being positioned in contact with the base unit. The on-base unit signal or the off-base unit signal, depending upon the position of the cordless handset, may be communicated over a communications network with which the base unit is in communication.

An embodiment of a method for sensing the physical position of a cordless handset with respect to a base unit may be performed by receiving an on-base unit status signal in response to a cordless handset being placed in contact with a base unit of a telephone. The received on-base unit status signal may be processed to determine the position of the cordless handset. In response to determining that the handset is in contact with the base unit, proceeding with a desired task may be performed.

One embodiment of a phone that operates in accordance with the principles of the present invention may include a base unit and a cordless handset. The base unit may include an input/output unit with a first input/output circuit configured to communicate first communications signals over a communications network and a second input/output circuit configured to wirelessly communicate second communications signals with the cordless handset. A cradle may be adapted to receive the cordless handset. At least two pairs of first conductors may be positioned in the cradle for the cordless handset to contact a first pair of conductors and be configured to provide a power source. A second pair of conductors may be configured to sense that the cordless handset is in contact with the base unit. The cordless handset may include a third input/output circuit and be configured to communicate the second communications signals with the cordless handset. At least two pairs of second conductors may be aligned to contact the two pairs of first conductors.

One embodiment of a system for sensing on-base unit and off-base unit positions of a cordless handset may include a computing device in communications with a communications network. The computing device may be configured to receive on-base unit and off-base unit status signals from the communications network. The on-base unit and off-base unit status signals indicate whether the cordless handset is in contact with the base unit of the cordless phone. The computing device may further be configured to generate an indicator of a current status of the handset.

BRIEF DESCRIPTION OF THE DRAWINGS

The principles of the present invention is described in detail below with reference to the attached figures, wherein.

DETAILED DESCRIPTION OF THE INVENTION

The principles of the present invention provide for a cordless telephone and method for sensing an on-base unit status of a handset of the cordless telephone. The cordless telephone may be a traditional cordless phone configured to communicate over a plain old telephone system (POTS) type communication network, a Voice over IP type (VOIP) phone, or any other type of cordless telephone (i.e., a telephone that includes a cordless handset and base unit to which the handset may communicate during a telephone call and/or charges the handset). The cordless telephone additionally may operate on any number of frequencies, including but not limited to 900 MHz, 2.4 GHz, or 5.8 GHz. The description that follows is directed to one or more embodiments, and should not be construed as limiting in nature.

Figure 1A:
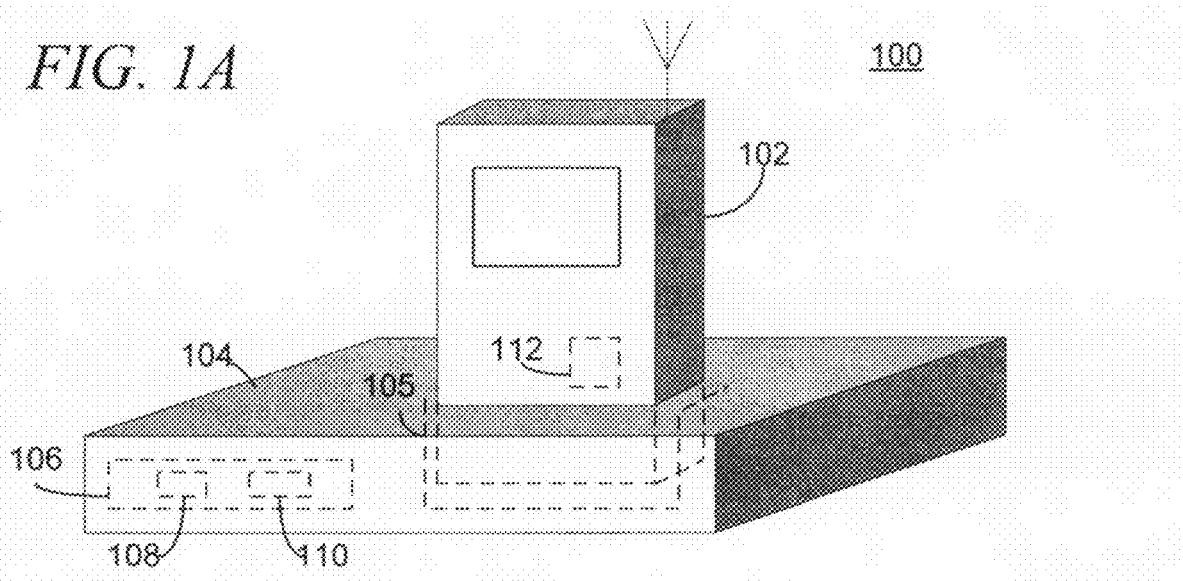
FIG. 1A is an illustration of an exemplary cordless telephone, including a handset and a base unit.

FIG. 1A depicts an exemplary cordless telephone 100 as contemplated by the principles of the present invention. The cordless phone 100 may include a handset 102 and a base unit 104. The base unit 104 may be designed so that the handset 102 is able to make continuous contact with the base unit 104 for charging the handset 102. As depicted in FIG. 1A, the handset 102 sits upon the base unit 104 in a cradle 105. It is to be understood that the cradle 105 does not have to be within the base unit 104, but may be in any arrangement that allows the handset 102 and the base unit 104 to be in contact to charge a battery (not shown) in the cordless handset. This contact position may be referred to as the "on-base unit" position. When the handset 102 is in the on-base unit position, the phone recharges the battery located inside the handset 102. The cordless phone 100 is typically in an on-hook position (i.e., not in a communication mode) when it is in the on-base unit position. Likewise, the cordless phone 100 may either be in the on-hook or off-hook position when it is not in the on-base unit position. The distinction between being on-base unit/off-base unit (i.e., handset in contact with base unit) and on-hook/off-hook (i.e., in communication or dialing mode) should be recognized and considered different for the purposes of this description. More particularly, rather than detecting if a phone line is in use or not in use (referred to as on-hook or off-hook respectively), being on-base unit or off-base unit is determined by detecting whether or not the handset 102 is physically placed in contact with the base unit 104, which is not equivalent to the on-hook/off-hook determination.

The base unit 104 may additionally include an input/output (I/O) unit 106 including two I/O circuits 108 and 110. The first I/O circuit 108 may be configured to communicate communications signals with a communications network. The communications network may be a traditional POTS network, IP network, or any type of network in which the telephone is configured to operate. The second I/O circuit 110 may be configured to wirelessly communicate communications signals between the base unit 104 and the cordless handset 102. Additionally, the second I/O circuit 110 in this embodiment may operate with radio signals at numerous frequencies. Some typical frequencies are 900 MHz, 2.4 GHz, or 5.8 GHz, but depending on the type and model of the phone, the frequencies may be otherwise. Within the handset 102, there may be a third I/O circuit 112 for communicating with the I/O circuit 110 on the base unit 104.

Figure 1B:
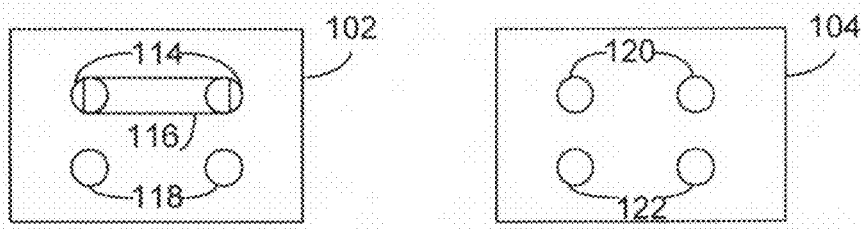
FIG. 1B is an illustration of exemplary contact points located on a handset and corresponding base unit.

FIG. 1B depicts conductors located on the base unit 104 and the handset 102. Two pairs of conductors 114, 118 and 120, 122 may be located on the handset 102 and base unit 104, respectively, as shown. It is anticipated that any number of conductors is possible, and the two pair embodiment should not be construed as limiting the disclosure. The pairs of conductors 114 and 118 may be located on the cordless handset 102, and the pairs of conductors 120 and 122 may be located on the base unit 104 in such a configuration that the pairs of conductors contact one another when the cordless handset 102 is placed on the base unit 104. In this embodiment, a conducting strip 116 is placed in contact with the top pair of the conductors 114 of the cordless handset 102. The conducting strip 116 may provide for a connection to be made between the pair of conductors 114 on the base unit 104 and will be described in greater detail below in reference to FIG. 3. It should be understood that the use of a conducting strip is exemplary and that other configurations to connect the conductors 114 or 120 may be utilized.

Figure 2:
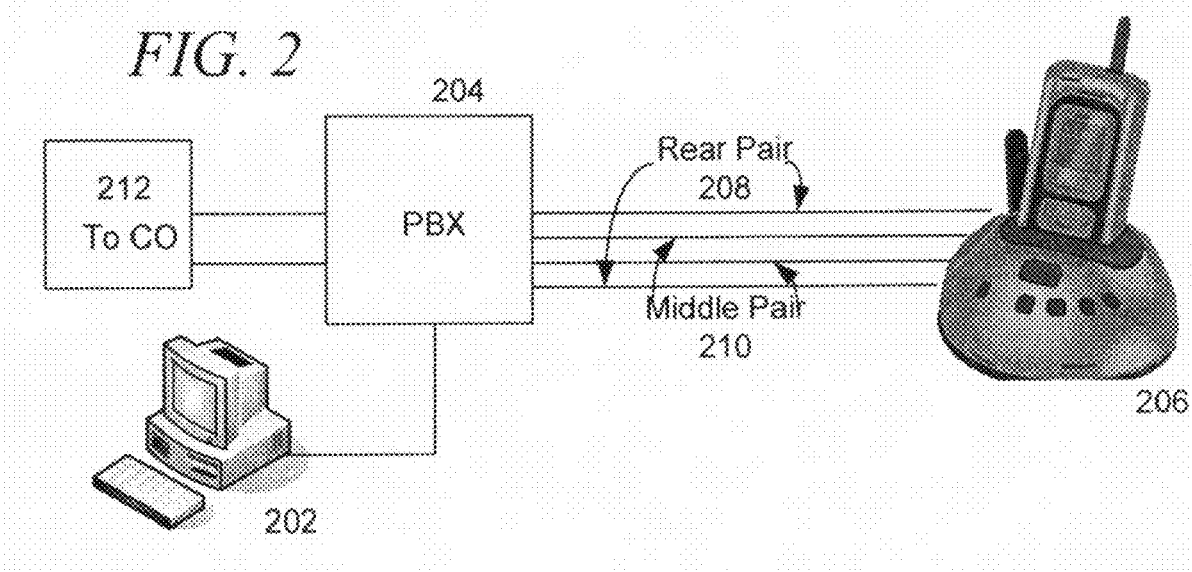
FIG. 2 is an illustration of a typical configuration of network services being delivered to a telephone through a local private branch exchange (PBX)

FIG. 2 depicts an exemplary telephone network 200 as contemplated by an embodiment of the present invention. The cordless telephone 206 may be connected by a four-wire copper loop to a local switch or PBX 204. The PBX 204 may be connected to a computing device 202, such as a point-of-service system in a hotel for checking guests in and out, or any other type of computing device capable of connecting to the PBX 204. The PBX 204 may additionally be connected to a Central Office (CO) 212 for providing communications to the PBX 204. The connection between the PBX 204 and the CO 212 may be copper, cable, fiber, or any other type of connection capable of communicating between the CO 212 and the PBX 204. Additionally, the connection between the PBX 204 and the telephone is not limited to a four-wire copper loop. Any type of network for providing communications between a local switch or PBX 204 and a telephone 206 is also contemplated. For example, if the telephone 206 is a WiFi or VoIP phone, the communications network between the PBX 204 and the cordless phone 206 may be Ethernet.

The four-wire copper loop connection as depicted in FIG. 2 includes a rear pair 208 and a middle pair 210. As understood in the art, the middle pair 210 may be used for connecting a single-line telephone set and the rear pair 208 may be used for a second line connection or may be unused. These wires may be connected to an RJ-11 phone jack (not shown) into which the cordless telephone 206 connects to enable the telephone to connect to the communications network. When the rear pair 208 is not in use, the rear two pins on the RJ-11 jack remain open, thereby providing an infinite resistance in the loop, and causing no current to flow through the wires or pins of the rear pair 208, as understood in the art. In one embodiment, the cordless telephone base unit generates a digital signal (e.g., "1" or "0") representative of an on-base unit and off-base unit state over a communications network in the case of a digital phone system, rather than different current levels, as would be done in an analog phone system.

Figure 3A:
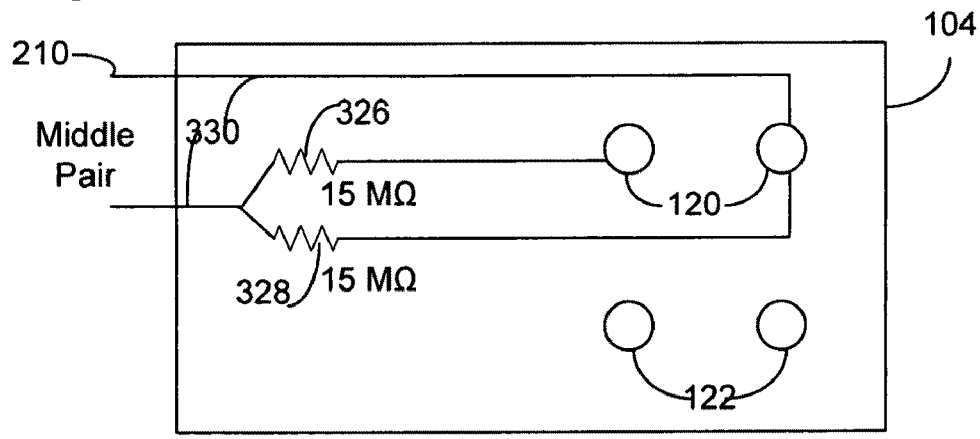
FIG. 3A is a wiring schematic of an exemplary base unit.

FIG. 3A is an electrical schematic diagram of an exemplary embodiment of a base unit, such as base unit 104. The conductors 120 and 122 are located at the base unit 104. One pair of the conductors 122 may be used for charging the cordless handset 102 when the cordless handset 102 is in contact with the base unit 104 (i.e., on base-unit). The other pair of conductors 120 may be connected to the middle pair 330 of a 4-wire copper loop. Using the middle pair allows for the rear pair (not shown) to be used for another RJ-11 jack or to remain unused. By connecting the middle pair 330 to the conductors 120, electrical current in the line may be detected in order to determine if the cordless handset 102 is in an on-base unit position.

In this embodiment, two 15MΩ resistors 326 and 328 are shown. When the cordless handset 102 is not in contact with the base unit 104, the total dc on-base unit resistance of the telephone is 15MΩ, as would be understood by one normally skilled in the art. When the cordless handset 102 is placed in contact with the base unit 104, the conducting pair 120 is connected to the conducting strip 116 and the conductors 114 from the handset, which causes resistor 326 to become part of the circuit, thereby causing the equivalent resistance of the telephone set to go down by half and the on-base unit electrical current to go up by double. This change of electrical current in the middle pair 330 may allow computing device 202 (FIG. 2) to detect that the cordless handset 102 is in contact with the base unit 104.

Figure 3B:
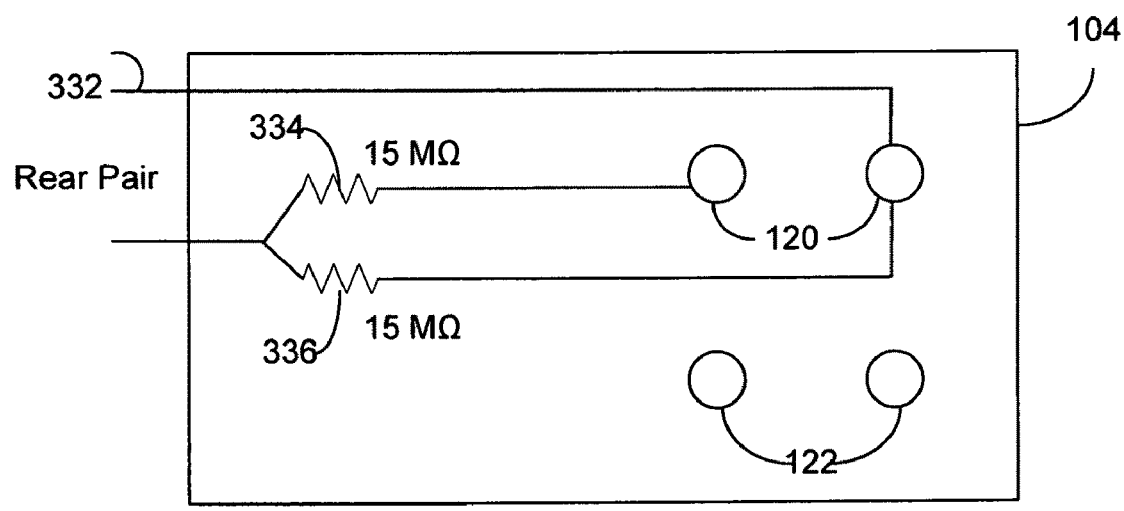
FIG. 3B is an alternative embodiment of a wiring schematic of the base unit.

One issue to note about using the middle pair 330 is that the change in on-hook resistance and current is similar to that which occurs when connecting a second phone in parallel with a first phone. For this reason, a second embodiment may be considered if the rear pair 208 (FIG. 2) is available for use. FIG. 3B is an electrical schematic diagram of a second exemplary embodiment as contemplated by the principles of the present invention. As before, there are two 15 MΩ resistors 334 and 336 that are shown, but in this embodiment, a rear pair 332 are connected to the base unit. As before, one pair of contacts 122 may be used for battery charging. The rear pair 332 is connected with the conductors 120 through the parallel configuration of the two resistors 334 and 336. The rear loop sees only one of the 15 MΩ resistors (i.e., resistor 336) when the cordless handset 102 is not in contact with the conductors 120. When contact is made between the base unit 102 and the handset 104, the dc resistance drops to half of its original value (i.e., 7.5MΩ), thereby causing a doubling of the on-base unit current. This change of on-base unit current may be detected by the computerized system 202 (FIG. 2) connected to the PBX or switch 204 providing for detection of the position of the cordless handset 102. Although shown as using 15 MΩ resistors, alternative resistor values and electrical circuit configurations may be utilized.

Figure 3C:
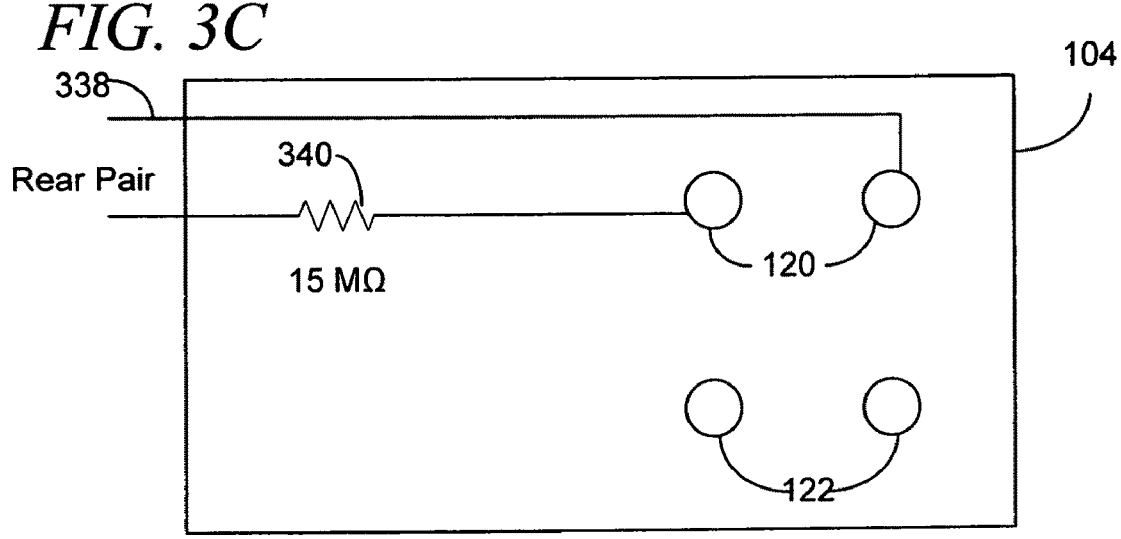
FIG. 3C is another alternative embodiment of a wiring schematic of the base unit.

FIG. 3C is an electrical schematic diagram of a third exemplary embodiment, where a rear pair 338 is connected, as in FIG. 3B, to the base unit 104. However, only one 15 MΩ resistor is provided in this embodiment. When there is no contact between the handset 102 and the base unit 104, there is no electrical current flowing through the rear pair 338 due to an open circuit existing between conductors 120. A change in electrical current may be detected by the computing device 202 when the handset 102 is placed into contact with the base unit 104 in that resistor 340 becomes connected as the rear pair 338 forms a loop due to the handset 102 completing the circuit between conductors 120. While this embodiment uses only one resistor 340 rather than two (see FIGS. 3A and 3B), a problem in detection of the change of on-base unit electrical current by creating a condition known as idle start. Idle start can also cause problems from some older PBX/switches.

Figure 4:
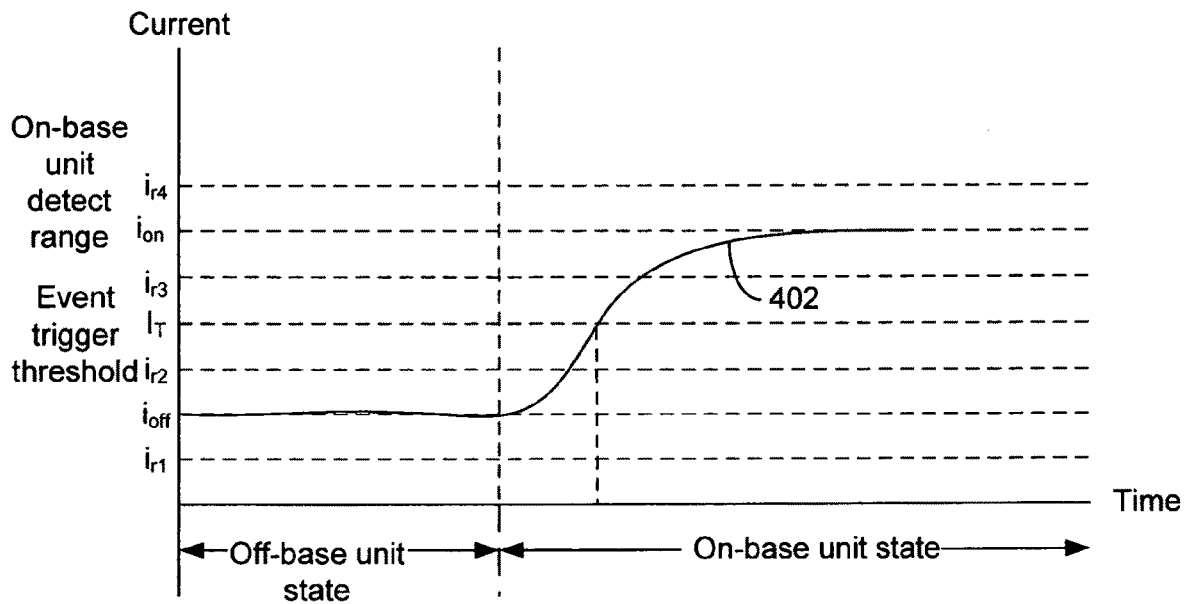
FIG. 4 is a signal diagram depicting an electrical current measured over time as the cordless handset is being placed on the base unit.

FIG. 4 is a signal diagram 400 depicting an electrical current 402 that may be measured over time as the cordless handset 102 is being placed on the base unit 104. The x-axis represents time, while the Y axis represents measured current level. In this figure, the electrical current 402 is being used for the purposes of determining whether the handset is on-base unit or off-base unit. However, voltage may also or alternatively be measured. For example, rather than the current 402 rising when the cordless handset 104 is placed on the base-unit 102 (as depicted in 400), the voltage would drop when the cordless handset 104 is placed on the base-unit 103 to be in an on-base unit position.

Using either a measurement of voltage or current, the on-base/off-base unit determination may be made by performing electrical current or voltage range detection or threshold detection. For electrical current or voltage range detection, the determination may be made that the cordless handset 102 is in the off-base unit position whenever the electrical current range is between $i_{r1}$ and $i_{r2}$. The determination may be made that the cordless handset is located in the on-base unit position when the current is in between $i_{r3}$ and $i_{r4}$. For threshold detection, a current threshold level $I_T$ may be monitored such that whenever the current passes $I_T$, (a threshold level), a status bit may change to indicate the present on-base/off-base unit position.

It should be noted that the measurement may be analog or digital. The current may be measured at PBX (FIG. 2, 204), where the current level would be analog on a traditional POTS type network. However, the current 402 may also be measured by a sensor in the base unit itself. In the event that the base unit is a digital telephone operating over Ethernet (for example a VoIP type phone), the measurement may be taken by a sensor (not shown) at the base unit that returns a bit (i.e. 0 or 1) representing the base-unit status.

Figure 5:
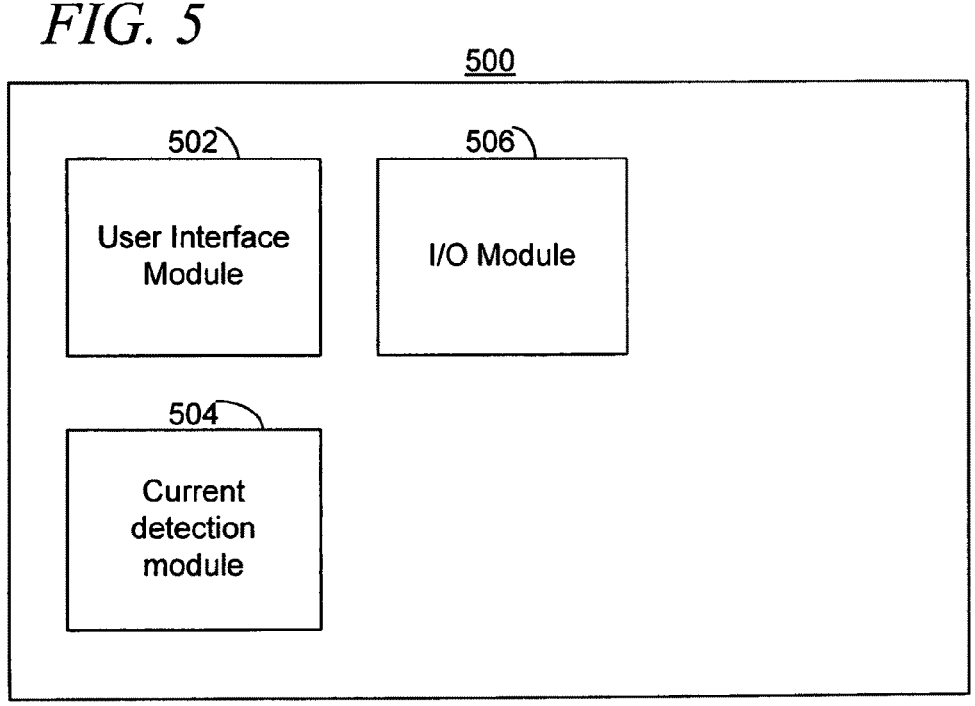
FIG. 5 is an illustration of exemplary software modules executed by a processing unit of the telephone of FIG. 1A.

FIG. 5 is an illustration of exemplary software modules 500 that may be executed in the computing system 202 and/or PBX for performing functions in accordance with the principles of the present invention. The software modules 500 may include a user interface module 502, current detection module 504, and I/O module 506. Either a PBX 204 (FIG. 2) or an adapter (not shown) may convert the communications signal from the cordless telephone from an analog into a digital format as input into the computing system 202. The input/output (I/O) module 506 may be configured to accept as an input a measurement of the electrical current from the cordless telephone system as sent from the PBX 204 or the adapter. The current detection module 504 may communicate with the I/O module 506 in receiving the measured electrical current. Alternatively, the I/O module 506 may process the on-base unit signal without the use of the current detection module 504. The use of the I/O module 506 without the use of the current detection module 504 may be relevant in situations where the on-base unit signal is not based on the electrical current, but another type of signal. Additionally, the user interface module 502 may also provide a Graphical User Interface (GUI) or inputs to a GUI for customer services such as the ability to check out a guest from a hotel or a patient from a hospital. The software modules 500 may include other software modules, fewer software modules, or software modules in combination depending upon the particular configuration of the communications network.

Figure 6:
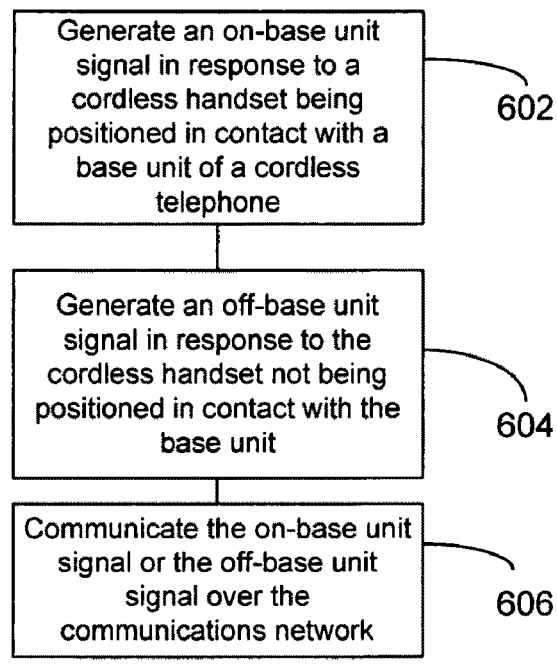
FIG. 6 is a flow chart of an exemplary process for providing an on-base unit status from a cordless telephone in accordance with the principles of the present invention.

FIG. 6 is a flow chart of an exemplary method 600 for providing on-base unit status from a cordless telephone. In one embodiment, an on-base unit signal may be generated in response to a cordless handset being positioned in contact with a base unit of a cordless telephone in step 602. This may be the telecommunications signal as found on a POTS type network or any other type of signal compatible to operate on the network in which the telephone is configured to operate (e.g. digital over Ethernet). An off-base unit signal may be generated in response to the cordless handset not being positioned in contact with the base unit at step 604. Depending on whether the cordless handset 102 is being placed on the base unit 104 or being removed from the base unit 104, the on-base unit or off-base unit signal (respectively is then communicated over the communications network in step 606.

Figure 7:
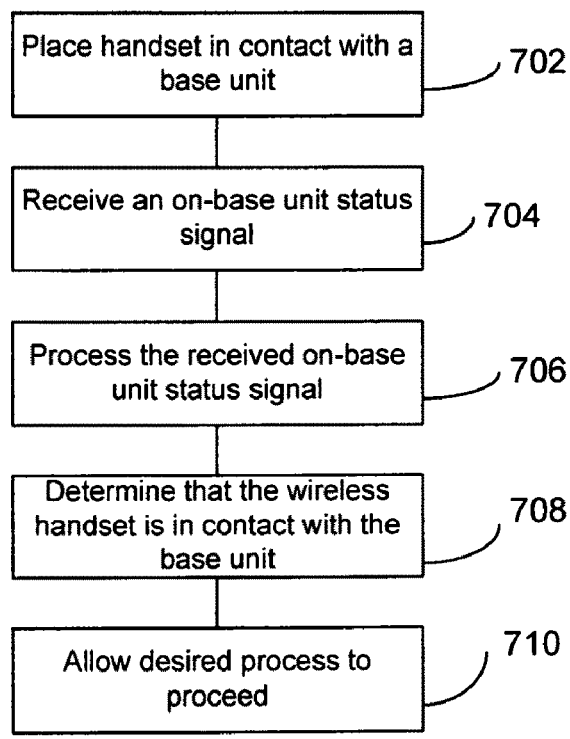
FIG. 7 is a flow chart of an exemplary process for sensing a physical position of a cordless handset with respect to a base unit in accordance with the principles of the present invention.

FIG. 7 is a flowchart of an exemplary method 700 for sensing a physical position of a cordless handset with respect to a base unit. The method is initiated by placing a handset in contact with a base unit in step 702. Next, an on-base unit status signal may be received in step 704. The received on-base unit status signal may then be processed in step 706. The determination may then be made that the cordless handset is in contact with the base unit in step 708. Finally, the determination is used to allow a desired process to proceed in step 710. An example of a process that is determinant on the on-base unit signal is whether or not a guest may check out of a hotel. The principles of the present invention may be used for nearly any hospitality, hospital, or other commercial or consumer applications.

The previous description is of at least one embodiment for implementing the invention, and the scope of the invention should not necessarily be limited by this description. The scope of the present invention is instead defined by the following claims.

What is claimed is:

1. A method for determining whether a cordless handset is positioned on a base unit of a cordless telephone, said method comprising:
    generating an on-base unit signal in response to a cordless handset being positioned in contact with a base unit of a cordless telephone;
    generating an off-base unit signal in response to the cordless handset not being positioned in contact with the base unit; and
    communicating the on-base unit signal or the off-base unit signal, depending upon position of the cordless handset, over a communications network with which the base unit is in communication.

2. The method according to claim 1, wherein generating the on-base unit and off-base unit signals includes generating a different electrical current level for each.

3. The method according to claim 2, further comprising communicating an on-hook signal or an off-hook signal when the cordless handset is not in communication mode or in communication mode, respectively.

4. A system for sensing on-base unit and off-base unit positions of a cordless handset, the system comprising:
    a computing device in communication with a communications network, said computing device configured to receive on-base unit and off-base unit status signals from the communications network, the on-base unit and off-base unit status signals being indicative of a cordless handset being in contact with a base unit of a cordless phone, said computing device further being configured to generate an indicator of a current status of the handset.

5. The system according to claim 4 further comprising a private branch exchange (PBX) configured to route signals for telephone communication and route the on-base and off-base status signals to the computing device.

6. The system according to claim 5 wherein the communications network is a Voice over IP communications network.

7. A system according to claim 4, wherein the on-base unit and off-base unit status signals are used to determine whether a customer can check out of a hotel.

8. The system according to claim 4, wherein the on-base unit status signal is derived from a measurement of an electrical current that has a first level when the handset is in contact with the base unit and a second level when the handset is not in contact with the base unit.

9. A method for sensing a physical position of a cordless handset with respect to a base unit, the method comprising:
    receiving an on-base unit status signal over a communications network in response to a cordless handset being placed in contact with a base unit of a telephone;
    processing the received on-base unit status signal to determine the position of the cordless handset; and
    in response to determining that the handset is in contact with the base unit, proceeding with a desired task.

10. The method according to claim 9, wherein processing the received on-base unit status signal includes determining whether an electrical current is above a threshold level.

11. The method according to claim 10, wherein proceeding with the desired task includes checking a guest out of a hotel.

12. The method according to claim 10, wherein proceeding with the desired task includes checking a patient out of a hospital.

* * * * *